US007307232B2

(12) United States Patent
Altmann et al.

(10) Patent No.: US 7,307,232 B2
(45) Date of Patent: Dec. 11, 2007

(54) ROTARY SWITCH

(75) Inventors: Markus Altmann, Moos-Bankholzen (DE); Karl-Heinz Wohlfahrt, Bodman-Ludwigshafen (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 232 days.

(21) Appl. No.: 11/112,264

(22) Filed: Apr. 22, 2005

(65) Prior Publication Data

US 2005/0241925 A1     Nov. 3, 2005

(30) Foreign Application Priority Data

Apr. 28, 2004   (DE)   ............... 20 2004 006 783 U

(51) Int. Cl.
*H01H 19/14* (2006.01)

(52) U.S. Cl. ................. 200/564; 200/11 R; 200/336

(58) Field of Classification Search ............... 200/564
See application file for complete search history.

(56) References Cited

U.S. PATENT DOCUMENTS

| 4,532,387 A | * | 7/1985 | Pliml, Jr. ................. 200/11 R |
| 4,797,520 A | | 1/1989 | Spazierer et al. |
| 5,565,663 A | | 10/1996 | Kossakowski et al. |
| 5,631,454 A | | 5/1997 | Hubacher et al. |
| 6,281,453 B1 | * | 8/2001 | Uleski ........................... 200/4 |
| 6,713,896 B1 | * | 3/2004 | Burtscher et al. ........... 307/112 |
| 6,894,242 B2 | * | 5/2005 | Muller et al. ............... 200/568 |

FOREIGN PATENT DOCUMENTS

| DE | 376188 | 5/1923 |
| DE | 7142911 | 2/1972 |
| DE | 2156033 | 5/1973 |
| DE | 3533055 | 9/1987 |
| DE | 4409460 | 2/1996 |
| DE | 19503904 | 8/1996 |
| EP | 0726629 | 8/1996 |
| EP | 0765775 | 4/1997 |

* cited by examiner

*Primary Examiner*—Elvin Enad
*Assistant Examiner*—Lheiren Mae A. Anglo
(74) *Attorney, Agent, or Firm*—Tarolli, Sundheim, Covell & Tummino LLP

(57) ABSTRACT

A rotary switch for installation in the dashboard of a vehicle has a switch housing, an actuation shaft that is arranged rotatably in the switch housing, a knob that is mounted on one end of the actuation shaft, and a ring-shaped faceplate that surrounds the knob and that is detachably fastened to the switch housing. The faceplate is connected to the switch housing by a locking mechanism. This locking mechanism can be released by a relative rotation between the faceplate and the switch housing. The knob can be moved axially in a predetermined rotational position and is coupled non-rotatably to the faceplate by means of this axial movement. In order to detach the faceplate from the switch housing, the knob is moved into the predetermined rotational position and then moved axially and turned at the same time, whereby the faceplate also turns and the latched connection between the faceplate and the switch housing is released.

20 Claims, 4 Drawing Sheets

ROTARY SWITCH

FIELD OF THE INVENTION

The present invention relates to a rotary switch for installation in the dashboard of a vehicle, comprising a switch housing, an actuation shaft arranged rotatably in the switch housing, a knob that is mounted on one end of the actuation shaft and a ring-shaped faceplate that surrounds the knob and that is detachably fastened to the switch housing.

BACKGROUND OF THE INVENTION

In vehicles, rotary switches are widely used for the functions of side lights, low beams, fog headlights and rear fog lights. Additional switching positions can be provided for the parking light and for an automatic function. These rotary switches are installed in a receiving opening in the dashboard of the vehicle. If there is a need for repairs, it should be possible to remove the rotary switch from the dashboard non-destructively. In a known configuration of a rotary switch, there are two sliding latches on the cylindrical part of the switch housing that are diametrically opposed to each other and that can be retracted and extended. In the retracted position of the latches, the switch housing can be slid into the receiving opening in the dashboard. In the extended position of the latches, they grasp behind the inner edge of the receiving opening in the dashboard, as a result of which the switch housing is secured axially in the dashboard. In the opposite axial direction, a ring-shaped faceplate—which is latched to the switch housing and which surrounds the rotary switch—lies on a recessed shoulder of the dashboard. The slides are actuated by setting the rotary switch in a certain rotational position, by axially moving the rotary switch in the direction of the switch housing with a pulling or pushing action and, at the same time, by turning the knob opposite to the action of recovery springs. The latches are now no longer projecting radially beyond the circumference of the switch housing so that said housing can be pulled out of the installation opening. However, since the latches only act as stops in the axial direction, the switch housing does not fit tightly in the installation opening of the dashboard.

SUMMARY OF THE INVENTION

The invention provides a rotary switch with which the switch housing can be attached simply, quickly and reliably in the installation opening of the dashboard and can be detached equally easily again. Preferably, the assembly and disassembly are carried out without special tools.

The rotary switch according to the invention for installation in the dashboard of a vehicle has a switch housing, an actuation shaft that is arranged rotatably in the switch housing, a knob that is mounted on one end of the actuation shaft, and a ring-shaped faceplate that surrounds the knob and that is detachably fastened to the switch housing. The faceplate is connected to the switch housing by a locking mechanism. This locking mechanism can be released by a relative rotation between the faceplate and the switch housing. The knob can be moved axially in a predetermined rotational position and is coupled non-rotatably to the faceplate by means of this axial movement. In order to detach the faceplate from the switch housing, the knob is moved into the predetermined rotational position and then moved axially and turned at the same time, whereby the faceplate also turns and the latched connection between the faceplate and the switch housing is released. After the faceplate has been detached from the switch housing and removed, the interior of the switch housing becomes accessible. From there, the attachment between the switch housing and the installation opening of the dashboard can be manipulated in order to detach the switch housing from the installation opening. Preferably, the switch housing is attached in the installation opening of the dashboard by means of latching elements, that is to say, with an interlocking fit, whereby the latching elements are accessible from the front of the switch housing in order to detach them from the latched connection if necessary, after which the switch housing can be pulled out of the installation opening in the dashboard. In order to attach the switch housing in the installation opening of the dashboard, the housing is merely slid in until its circumferential edge comes to lie on a recessed shoulder of the installation opening in the dashboard, after which the latching elements automatically latch in the dashboard.

In the preferred embodiment, the non-rotatable coupling between the knob and the faceplate is created by a radially projecting cam on the knob or on the faceplate and by a corresponding axial groove on the faceplate or on the knob. The cam only engages the axial groove in the predetermined rotational position and only in the axially shifted position of the knob. In all other rotational positions, the radially projecting cam prevents the axial shifting of the knob.

The locking mechanism is preferably a bayonet-type mechanism. For this purpose, axially ascending slits are formed in the circumferential wall of the faceplate and corresponding, radially projecting pins are arranged on the outer circumference of the switch housing.

BRIEF DESCRIPTION OF THE DRAWINGS

Further features and advantages of the invention ensue from the description below of a preferred embodiment and from the accompanying drawings. The drawings show the following.

DESCRIPTION OF AN EXAMPLE

Figure 1:
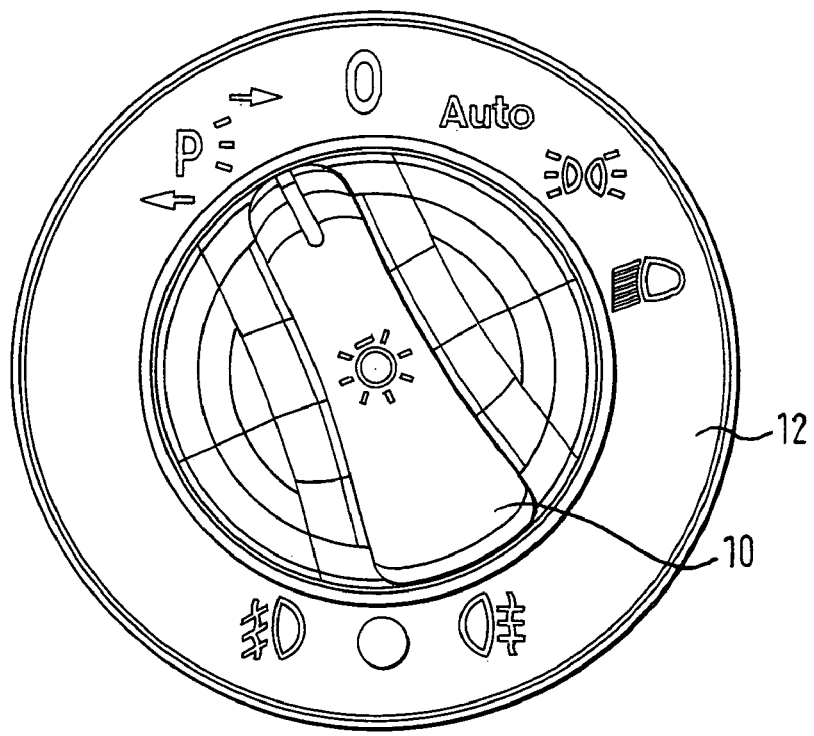
FIG. 1 a front view of a rotary switch for installation in a dashboard of a vehicle.

The view in FIG. 1 shows a central knob 10 of the rotary switch and a ring-shaped faceplate 12 surrounding said knob 10. The knob 10 is provided with an elongated, profiled grip part. The faceplate 12 has symbols indicating the various switching positions. The rotational position of the knob 10 shown in FIG. 1 is marked by a symbol P (parking light) and by an arrow pointing towards the right.

Figure 2:
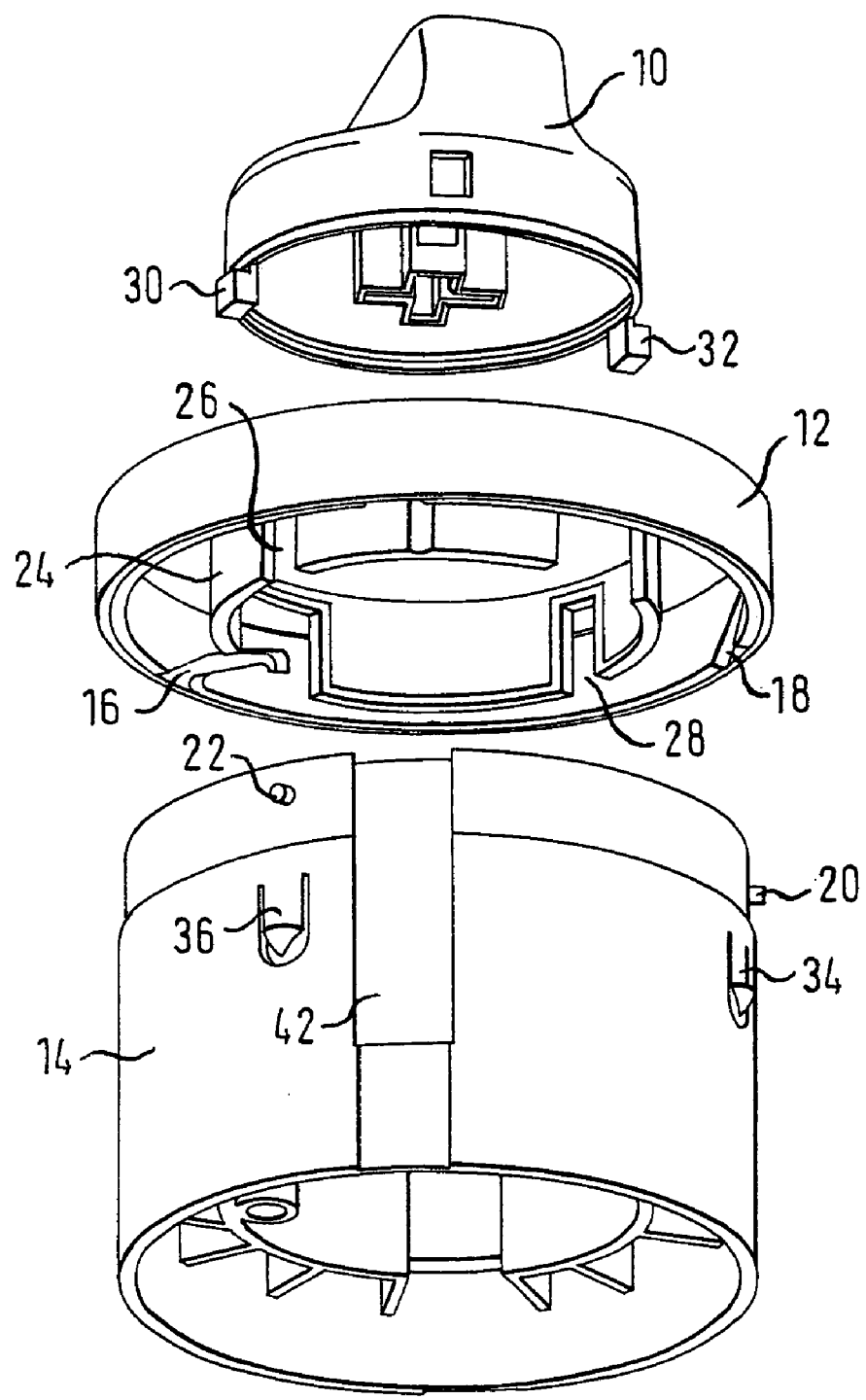
FIG. 2 an exploded perspective view of the components of the rotary switch.

As can be seen in FIG. 2, the knob consists of a switch housing 14, the faceplate 12 and the knob 10. The faceplate 12 is attached to the switch housing 14 by means of a latching device. This latching device is of the bayonet type and has two axially ascending slits 16, 18 in the outer circumferential wall of the faceplate 12 as well as two corresponding pins 20, 22 on the outer circumference of the switch housing 14.

The faceplate 12 has an inner circumferential wall 24 that has two axial slits 26, 28 (here diametrically opposite from each other). The knob 10 has two radially projecting cams 30, 32 that are likewise arranged axially opposite from each other.

Figure 3:
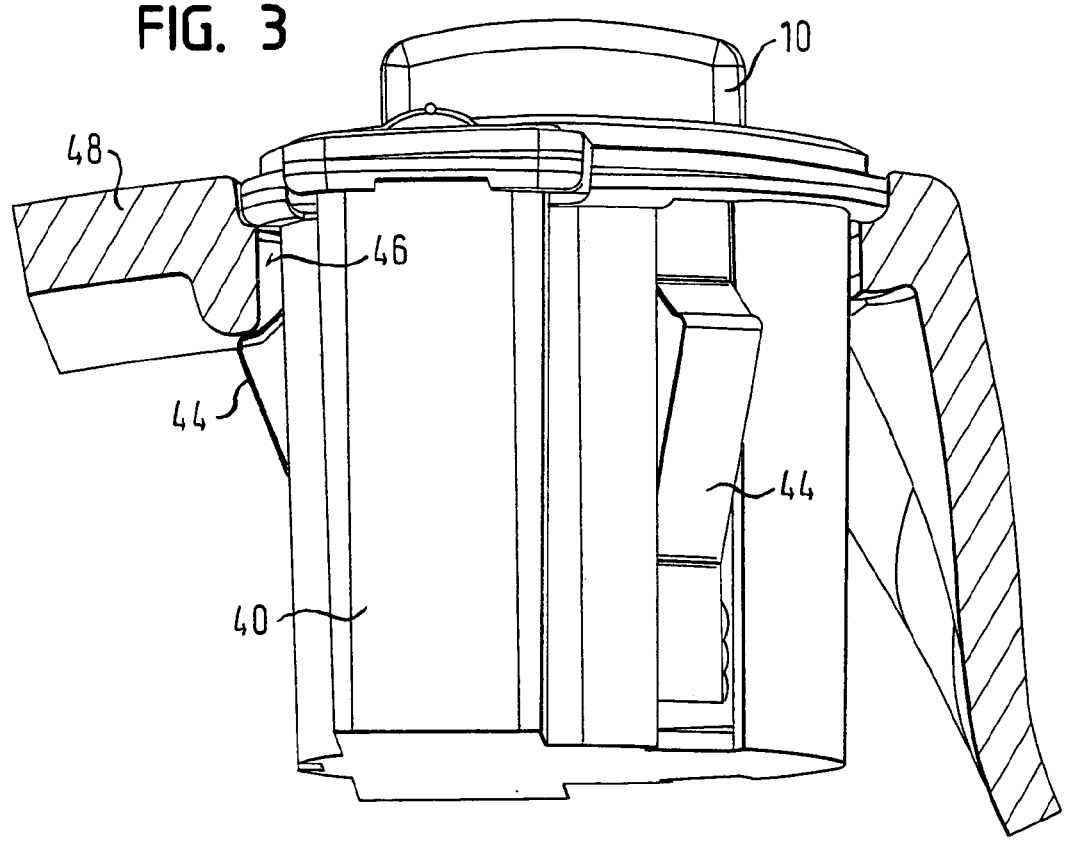
FIG. 3 a diagram to illustrate the installation situation of the rotary switch in a dashboard.

On the outer circumference of the switch housing 14, there are latching tabs 34, 36. These latching tabs 34, 36 are used to latch the switch housing 14 into the receiving opening of a pot-like support housing 40, which is shown in FIG. 3. In axial grooves 42 on the outer circumference of the switch housing, there are latching springs 44 that penetrate radially through slits into the support housing 40. As shown in FIG. 3, the support housing 40 with the switch housing 14 as well as optionally with other functional units (variable transformer, button, etc.) accommodated therein is inserted into an installation opening 46 of a dashboard 48. In this process, the latching noses on the latching springs 44 grasp behind the inner circumferential edge of the installation opening 46, as a result of which the support housing 40 is secured axially onto the dashboard support 48, along with the knob and other optional functional elements.

Figure 4:
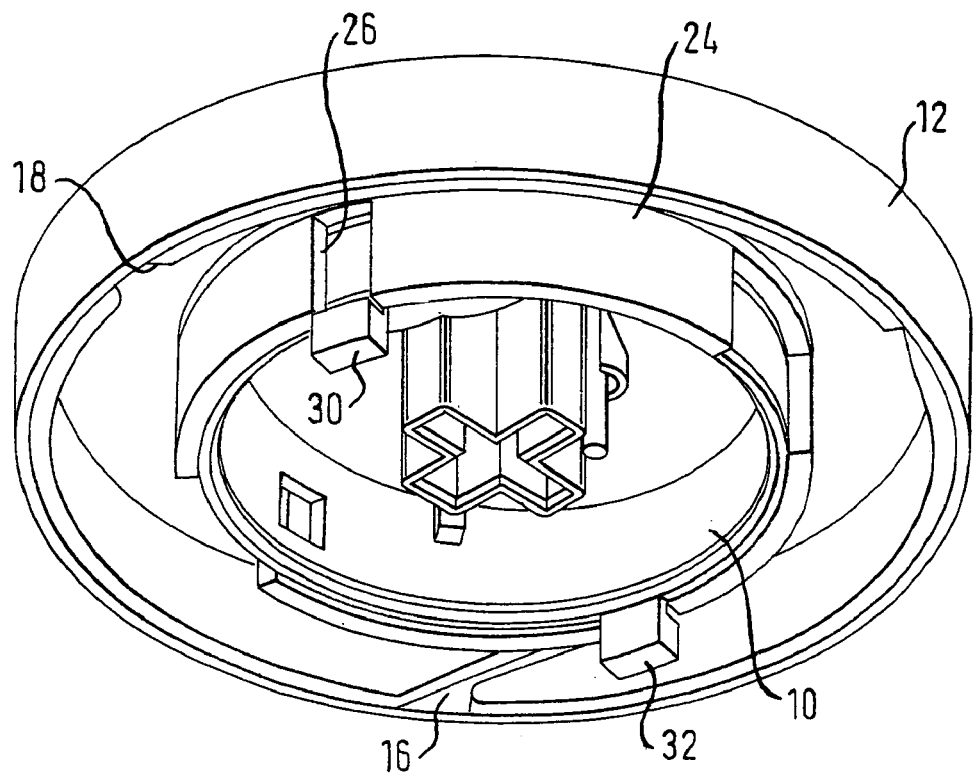
FIG. 4 a perspective view of a faceplate of the rotary switch with the knob in a viewing angle that is slanted downwards.
Figure 5:
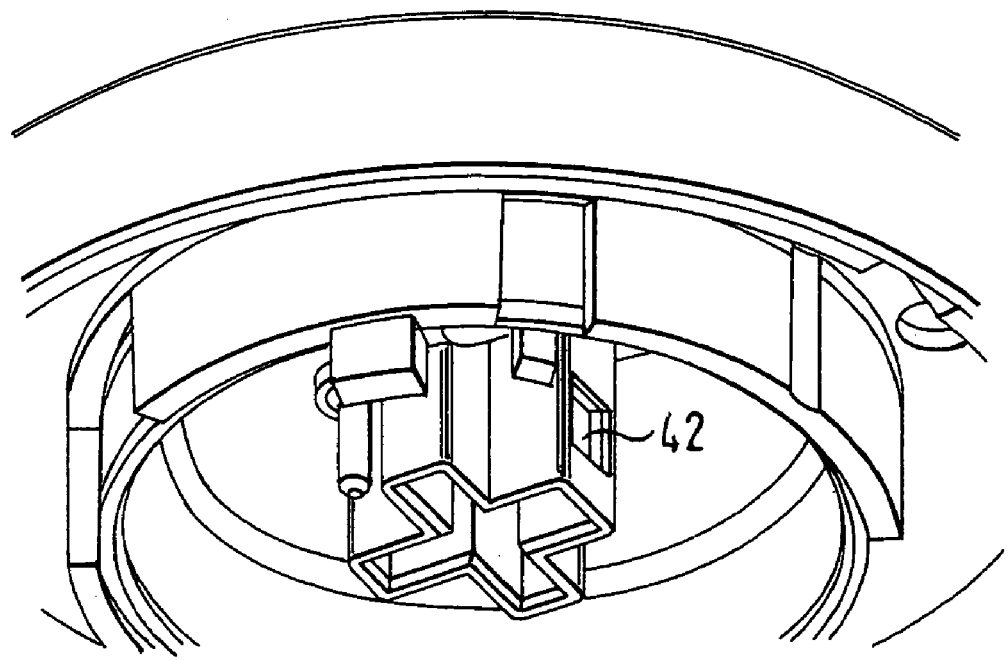
FIG. 5 a partial view analogous to FIG. 4, but in a changed relative view of the faceplate and the knob.
Figure 6:
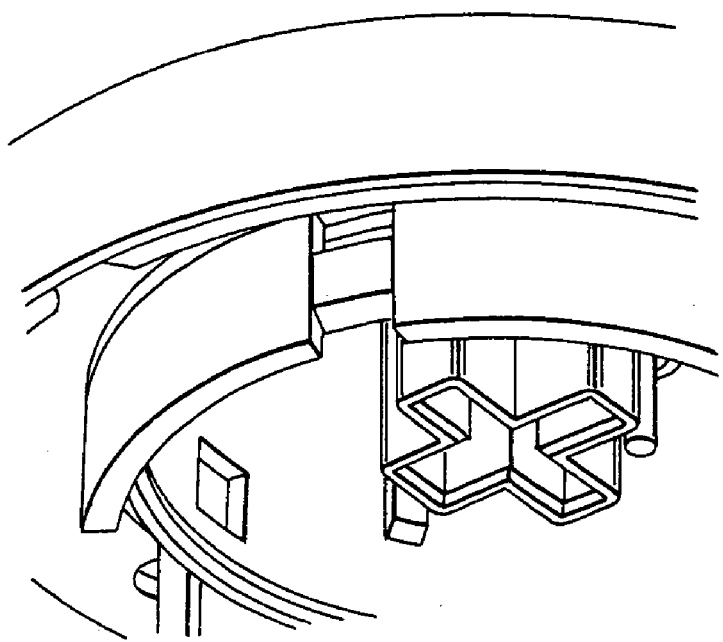
FIG. 6 another partial perspective view analogous to FIG. 4, but in a different relative rotational and axial position between the faceplate and the knob.

The views in FIGS. 4, 5 and 6 serve to explain the mode of function when the faceplate 12 is detached from the switch housing 14. In the state shown in FIGS. 4 and 5, the faceplate 12 is still coupled to the switch housing 14 that is not shown in the drawing in order to leave a clear view under the faceplate and the knob. The relative position of the faceplate 12 and the knob 10 shown in FIG. 4 corresponds to the rotational position shown in FIG. 1. In this rotational position, the radially projecting cams 30, 23 of the knob 10 are axially flush with the corresponding slits 26, 28 of the inner circumferential wall 24 of the faceplate 12. In all other relative rotational positions between the knob 10 and the faceplate 12, the cams 30, 32 grasp behind the free front edge of the inner circumferential wall 24 as shown in FIG. 5, as a result of which the knob 10 is prevented from making an axial movement.

If, in the rotational position shown in FIG. 4, the knob 10 is moved in the direction of the switch housing 14 by pulling on it, then the cams 30, 32 enter the corresponding axial slits 26, 28, whereby the knob is coupled non-rotatably to the faceplate 12. The knob 10 can now be rotated clockwise, whereby the faceplate 12 also turns with it. As a result, the latched connection between the faceplate 12 and switch housing 14 is released. The faceplate 12 can now be lifted off the switch housing 14. Once the faceplate 12 has been detached from the switch housing 14, the latching springs 44 on the circumference of the switch housing 44 become accessible from the front of said housing. By radially pressing in the latching springs 44, their latching noses are disengaged from the installation opening 46 in the dashboard 48, so that it is easy to pull out the support housing 40 together with the switch housing 14 out of the dashboard 48.

Figure 7:
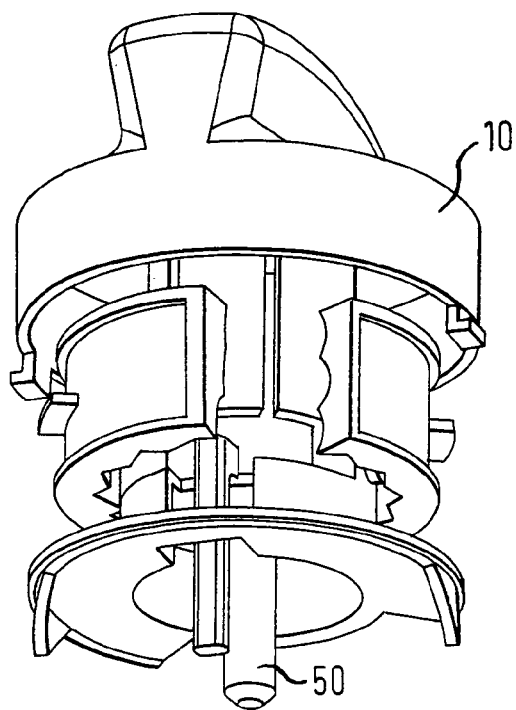
FIG. 7 a perspective partial view of the knob with parts of the switch mechanism.

FIG. 7 shows details of the switch mechanism actuated with the knob 10, whereby especially the actuation shaft 50 can be seen that is coupled non-rotatably to the knob and connected by latching elements.

The invention claimed is:

1. A rotary switch for installation in the dashboard of a vehicle, comprising a switch housing, an actuation shaft rotatably mounted in the switch housing, a knob that is mounted on one end of the actuation shaft, a ring-shaped faceplate that surrounds the knob, a locking mechanism for releasably locking the faceplate with the switch housing and coupling means for releasably coupling the knob with the faceplate for joint rotation; said locking mechanism being actuated by relative rotation between the switch housing and the faceplate and said coupling means selectively coupling the knob with the faceplate only in a predetermined rotational and axially shifted position of the knob.

2. The rotary switch according to claim 1, wherein the coupling means includes at least one radially projecting cam on one of the knob and the faceplate and a corresponding axial groove on the other of the knob and the faceplate, the radially projecting cam only engaging the axial groove in the axially shifted rotational position of the knob.

3. The rotary switch according to claim 2, wherein the axial groove is formed in an inner circumferential wall of the faceplate and the radially projecting cam is arranged on the knob and projects radially from the knob.

4. The rotary switch according to claim 1, wherein the locking mechanism is a bayonet mechanism.

5. The rotary switch according to claim 1, wherein latching elements are arranged on the outer circumference of the switch housing for latching to an installation opening of the dashboard.

6. The rotary switch according to claim 1, wherein the axially shifted position of the knob is reached by pulling on the knob.

7. A rotary switch for installation in the dashboard of a vehicle, comprising a switch housing, an actuation shaft rotatably mounted in the switch housing, a knob that is mounted on one end of the actuation shaft, a ring-shaped faceplate that surrounds the knob, a bayonet mechanism for releasably locking the faceplate with the switch housing, and coupling means for releasably coupling the knob with the faceplate for joint rotation, said bayonet mechanism being actuated by relative rotation between the switch housing and the faceplate and said coupling means selectively coupling the knob with the faceplate only in a predetermined rotational and axially shifted position of the knob, the bayonet mechanism comprising a plurality of axially ascending slits in a circumferential wall of the faceplate and corresponding radially projecting pins on the outer circumference of the switch housing.

8. A rotary switch for installation in the dashboard of a vehicle, comprising a switch housing, an actuation shaft rotatably mounted in the switch housing, a knob that is mounted on one end of the actuation shaft, a ring-shaped faceplate that surrounds the knob, a locking mechanism for releasably locking the faceplate with the switch housing and coupling means for releasably coupling the knob with the faceplate for joint rotation; said locking mechanism being actuated by relative rotation between the switch housing and the faceplate and said coupling means selectively coupling the knob with the faceplate only in a predetermined rotational and axially shifted position of the knob, latching elements being arranged on the outer circumference of the switch housing for latching to an installation opening of the dashboard, the latching elements being accessible from the front of the switch housing only after removal of the faceplate from the switch housing.

9. A rotary switch for installation in the dashboard of a vehicle, comprising a switch housing, an actuation shaft rotatably mounted in the switch housing, a knob that is mounted on one end of the actuation shaft, a ring-shaped faceplate that surrounds the knob, a locking mechanism for releasably locking the faceplate with the switch housing and coupling means for releasably coupling the knob with the faceplate for joint rotation; said locking mechanism being actuated by relative rotation between the switch housing and the faceplate and said coupling means selectively coupling the knob with the faceplate only in a predetermined rotational and axially shifted position of the knob, the coupling means including at least one radially projecting cam on one of the knob and the faceplate and a corresponding axial groove on the other of the knob and the faceplate, the cam only engaging the axial groove in the axially shifted rotational position of the knob, the axial groove being formed in an inner circumferential wall of the faceplate and the cam being arranged on the knob and projecting radially from the knob;

in all rotational positions of the knob, except for the predetermined rotational position, the radially projecting cam engaging behind a free annular front face of the inner circumferential wall.

10. A rotary switch for installation in the dashboard of a vehicle, comprising a switch housing, an actuation shaft rotatably mounted in the switch housing, a knob that is mounted on one end of the actuation shaft, a ring-shaped faceplate that surrounds the knob, a locking mechanism for releasably locking the faceplate with the switch housing and coupling means for releasably coupling the knob with the faceplate for joint rotation; said locking mechanism being actuated by relative rotation between the switch housing and the faceplate and said coupling means selectively coupling the knob with the faceplate only in a predetermined rotational and axially shifted position of the knob, latching elements being arranged on the outer circumference of the switch housing for latching to an installation opening of the dashboard, the switch housing being inserted into a pot-like support housing which, in turn, is inserted into an installation opening of the dashboard, and the support housing having an outer wall with recesses through which the latching elements extend radially outwardly.

11. A rotary switch for installation in the dashboard of a vehicle, comprising:
   a switch housing;
   an actuation shaft rotatably mounted in the switch housing;
   a knob that is mounted on one end of the actuation shaft and rotatable with the actuation shaft relative to the switch housing;
   a ring-shaped faceplate that surrounds the knob, the knob being rotatable relative to the face plate when the knob is in a first axial position relative to the faceplate;
   a locking mechanism releasably locking the faceplate with the switch housing, the locking mechanism locking the faceplate with the switch housing upon relative rotation between the switch housing and the faceplate; and
   a coupling mechanism releasably coupling the knob with the faceplate to prevent relative rotation between the knob and the faceplate, the coupling mechanism preventing relative rotation between the knob and the faceplate when the knob is in a second axial position relative to the faceplate.

12. The rotary switch according to claim 11, wherein the coupling mechanism permits axial movement of the knob relative to the faceplate only when the knob is in a predetermined rotational position relative to the faceplate.

13. The rotary switch according to claim 11, wherein the coupling mechanism includes at least one radially projecting cam on one of the knob and the faceplate and a corresponding axial groove on the other of the knob and the faceplate, the radially projecting cam extending into the axial groove when the knob is in the second axial position relative to the faceplate.

14. The rotary switch according to claim 13, wherein the axial groove is formed in an inner circumferential wall of the faceplate and the radially projecting cam is arranged on the knob and projects radially from the knob.

15. The rotary switch according to claim 14, wherein the radially projecting cam engages behind a free annular front face of the inner circumferential wall.

16. The rotary switch according to claim 11, wherein the locking mechanism is a bayonet mechanism.

17. The rotary switch according to claim 11, wherein latching elements are arranged on the outer circumference of the switch housing for latching to an installation opening of the dashboard.

18. The rotary switch according to claim 17, wherein the latching elements are accessible from the front of the switch housing after removal of the faceplate from the switch housing.

19. The rotary switch according to claim 17, wherein the switch housing is inserted into a pot-like support housing which, in turn, is inserted into an installation opening of the dashboard, and the support housing having an outer wall with recesses through which the latching elements extend radially outwardly.

20. The rotary switch according to claim 11, wherein the knob is pulled away from the faceplate to move the knob from the first axial position to the second axial position.

* * * * *